(12) United States Patent
Osten

(10) Patent No.: US 6,708,415 B1
(45) Date of Patent: Mar. 23, 2004

(54) MAGNETIC COMPASS STRUCTURE

(76) Inventor: Eugene Victor Osten, 1426 E. 20th St., Santa Ana, CA (US) 92705

( * ) Notice: Subject to any disclaimer, the term of this patent is extended or adjusted under 35 U.S.C. 154(b) by 0 days.

(21) Appl. No.: 10/159,844

(22) Filed: Jun. 3, 2002

(51) Int. Cl.[7] .......................... G01C 17/38; G01C 17/02
(52) U.S. Cl. .................... 33/356; 33/364; 33/355 D; 33/345; 33/346; 33/DIG. 1
(58) Field of Search .............................. 33/355 R, 356, 33/364, 355 D, 1 E, DIG. 1, 344, 345, 346

(56) References Cited

U.S. PATENT DOCUMENTS

| | | | | | |
|---|---|---|---|---|---|
| 1,792,639 A | * | 2/1931 | Herrick | ........................ | 33/1 E |
| 3,831,287 A | * | 8/1974 | Sawdo et al. | ................. | 33/344 |
| 3,983,636 A | * | 10/1976 | Fashbaugh et al. | ........... | 33/346 |
| 4,091,664 A | * | 5/1978 | Zerver | ..................... | 73/862.21 |
| 4,227,313 A | * | 10/1980 | Hennessy | ..................... | 33/364 |
| 4,357,756 A | * | 11/1982 | DeGaeta et al. | .......... | 33/355 R |
| 4,402,140 A | * | 9/1983 | Nagae | .......................... | 33/272 |
| 4,614,041 A | * | 9/1986 | Darton et al. | ................. | 33/313 |
| 4,694,584 A | * | 9/1987 | Mills | ....................... | 33/366.13 |
| 5,233,759 A | * | 8/1993 | Gloor et al. | .............. | 33/355 R |
| 5,452,519 A | * | 9/1995 | Crocker et al. | .......... | 33/366.17 |
| 5,560,115 A | * | 10/1996 | Fowler | ........................ | 33/361 |

* cited by examiner

*Primary Examiner*—Diego Gutierrez
*Assistant Examiner*—Yaritza Guadalupe
(74) *Attorney, Agent, or Firm*—G. Donald Weber, Jr.

(57) ABSTRACT

An Improvement to enhance the usability of magnetic compasses by eliminating acceleration and turning errors, especially in aviation applications, without compromising simplicity and reliability. The improvement includes the addition of a weightless mass to the bar magnet of a conventional magnetic compass to counteract undesirable inertial forces on the bar magnet.

8 Claims, 1 Drawing Sheet

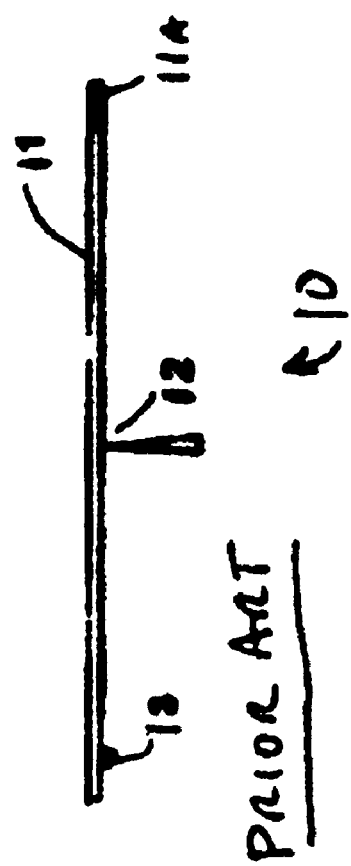

MAGNETIC COMPASS STRUCTURE

BACKGROUND OF THE INVENTION

1. Field of the Invention

The invention relates to magnetic compasses used in aviation, in general, and to improved magnetic compasses which correct for acceleration and turning errors as well as magnetic dip forces, in particular.

2. Prior Art

A magnetic compass was one of the first instruments to be installed in an airplane, and it is still the only direction-seeking instrument in many smaller aircraft. One great advantage of such a compass is that it is a self-contained unit which does not require electrical or vacuum power. To determine direction, the compass uses a simple bar magnet with two poles. The bar magnet in the compass is mounted so that it can rotate freely and align itself automatically with the Earth's magnetic field.

However, magnetic compasses are subject to a problem called "magnetic dip" because the lines of flux of the Earth's magnetic field are not parallel to the Earth's surface (except at the magnetic equator). Since the compass needle aligns itself with the lines of flux, the north-seeking end of the needle tends to dip toward the Earth (in the Northern Hemisphere). This dip angle is caused by the vertical component of the Earth's magnetic field and increases from zero at the magnetic equator to almost 90 degrees near the magnetic pole. Many magnetic compasses (including those used in aviation) have a small weight on the south-pointing (again in the Northern Hemisphere) end of the needle to counteract this magnetic dip by using gravitational force. That is, a counterweight is added to the end of the compass needle which points away from the magnetic pole. This arrangement does, indeed, almost completely fix the dip problem and has been used on compasses for many years. Unfortunately, this technique introduces two new errors, called the "acceleration error" and the "turning error." These errors are exhibited as unwanted needle movements when the compass is subjected to inertial forces, viz. due to change in speed and/or direction. The inertial force acts on the counterweight of the needle and produces a torque about the pivot at which the compass is suspended because the mass of the needle is not equal on both sides of the pivot point. This torque causes the needle and the attached card (in aviation compasses) to rotate and thereby give a false reading.

During acceleration or deceleration of an airplane on an easterly or westerly heading, an erroneous indication will occur. During acceleration, inertia causes the compass weight on the south end of the bar magnet to lag slightly and turn the compass toward a North indication even though no change of direction has taken place. During a deceleration, inertia causes the weight to move slightly ahead, which moves the compass toward a southerly heading indication. The compass will return to its previous, and proper, heading once the acceleration or deceleration subsides.

This acceleration error does not occur when flying on a directly north or south heading because the dip compensation weight is in line with the direction of travel, but becomes more pronounced as the plane's heading is closer to due east or west. These acceleration error examples are valid only for the northern hemisphere; the effects are reversed in the southern hemisphere.

Turning error is also caused by inertial forces acting on the counterweight. It is most pronounced when turning from headings of due north or south. At the beginning of a turn from a heading of north, inertia (in the form of centrifugal force) forces the counterweight to the outside of the turn so the compass initially indicates a turn in the opposite direction. When the turn is established, the compass card begins to rotate in the correct direction, but it lags behind the actual heading. The amount of lag decreases as the turn continues, then disappears as the airplane reaches a heading of east or west.

When turning from a heading of east or west to a heading of north, there is no error at the beginning of the turn. However, as the heading approaches north, the compass increasingly lags behind the airplane's actual heading. When turning from a heading of south, the compass initially indicates a turn in the proper direction but leads the airplane's actual heading This error also diminishes as the airplane reaches a heading of east or west. Turning from east or west to a heading of south causes the compass to move correctly at the start of a turn, but then it increasingly leads the actual heading as the airplane nears a southerly direction. (As in acceleration errors, these turning errors are only valid for flight in the Northern Hemisphere but in the Southern Hemisphere act in the opposite directions.) A more detailed description may be found in "Private Pilot Manual" by Jeppeson Sanderson Training Products.

SUMMARY OF THE INSTANT INVENTION

One solution to the error situation in a magnetic compass is to balance the inertial forces on each end of the needle without affecting the weight distribution. This is accomplished by fastening a small capsule to the north-seeking end of the needle which capsule has the same mass as the counterweight, but has zero weight because it is designed to have the same density as the fluid with which the compass is filled. Of course, the capsule could be designed to be integral with the needle, as well.

In a preferred embodiment, the capsule is hollow. The result of incorporating such a capsule is that inertial forces cause no torque because the mass of the needle is equal on both sides of the pivot. The balance of the gravitational force acting on the counterweight versus the vertical component of the magnetic force acting on the needle remains undisturbed.

The magnetic compass is made more usable and less error prone over a wide range of acceleration and turning conditions. It may, therefore, be used as a stable reference source for a heading Indicator or other instrumentation.

The inherent reliability of the magnetic compass is retained inasmuch as no moving parts nor a power source are required.

The improved magnetic compass is considerably more useful to a pilot because its reading is more stable and accurate. Since it is not subject to the acceleration and turning errors, it can be read in non-straight-and-level flight maneuvering. This difference could be of extreme importance should the aircraft experience a vacuum failure (which renders the gyroscopic Heading Indictor inoperable in a typical General Aviation craft).

BRIEF DESCRIPTION OF THE DRAWINGS

FIG. 1 is a schematic representation of an existing magnetic compass.

FIG. 2 is a schematic representation of one embodiment of an improved magnetic compass of the instant invention incorporating a compensating, weightless mass on the needle.

DESCRIPTION OF PREFERRED EMBODIMENTS

Referring now to FIG. 1, there is shown a schematic representation of a known magnetic compass 10. The compass 10 comprises a compass needle 11 mounted on a conventional pivot 12. Typically, the compass needle 11 is fabricated of a magnetic material. The method of manufacturing the compass needle is well known in the art.

In use, the compass needle 11 tends to rotate around the pivot 12 so that it is aligned with the magnetic flux lines of the Earth with tip 11A pointing toward the magnetic pole. As is well known, the magnetic tip 11A of the needle on an aircraft magnetic compass tends to dip downwardly toward the magnetic pole of the Earth along the Earth's magnetic flux lines.

In the prior art compass, an attempt to offset the magnetic dip was made by adding a counterweight 13, to the tip of the needle that points away from the magnetic pole. However, as noted supra, the counterweight caused complications of its own.

Referring now to FIG. 2, there is shown a schematic representation of the improved compass of the instant invention.

In this embodiment, the components remain largely unchanged from the prior art. For example the needle 21 rotates on the pivot 22. Likewise, the needle 21 has a tip 21A and a counterweight 23 at the opposite end thereof.

However in this embodiment, a mass 24 is formed on the needle 21 adjacent to the North-pointing end thereof. The mass 24 can be added to the needle 21 as a separate component. Conversely, the mass 24 can be formed integrally with the needle.

The significant characteristic of the mass 24 is that it should be essentially weightless but have the same mass as the counterweight 23.

The shape and fabrication technique for providing the mass 24 is largely a function of design or manufacturing preference. For example, the mass 24 can be a hollow sphere attached to the needle 21. Alternatively, the mass 24 can be a body or housing formed as a part of the needle 21 during fabrication thereof.

Typically, in a magnetic compass used in aircraft the needle is immersed in a liquid within a housing. By using a hollow sphere for the mass 24, the mass will tend to float in the liquid thereby establishing a "weightless" condition.

Alternatively, by forming the mass of a material which is of a density which is equal to the density of the liquid in the compass housing, the mass 24 will be, effectively, weightless.

However the mass 24 will be subject to the laws of physics, i.e. F=mA, as is the mass of the counterweight 23. By making the mass of mass 24 equal to the mass of counterweight 23, the inertial effects of the counterweight are balanced and no torque about the pivot is experienced. Thus, the inertial effects of the counterweight 23 on the needle 21 during acceleration and/or turning are counterbalanced and operation of the compass is enhanced. It is recognized that in many aircraft magnetic compasses, the "needle" actually comprises two needles or bar magnets acting in concert and mounted within a rotating card. The instant description is intended to include such devices. That is, the drawings and description are a simplified depiction of existing devices and are intended to cover such devices, as well.

The improved compass structure enjoys many advantages. For example, the simplicity of the magnetic compass is retained because only one non-movable part is added (or integrated). Thus, the manufacturing cost of the improved compass remains about the same. As a result, once it is certified, the improved compass can be sold without difficulty to current and future customers as standard or upgrade equipment.

Thus, there is shown and described a unique design and concept of an improved magnetic compass structure especially useful in aircraft environment. This improvement nullifies the effect of an unwanted force (or force component) by counteracting this force (or force component). While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A magnetic compass having a housing and a fluid contained within said housing, at least one magnetic bar movably mounted in the housing and immersed in the fluid, and a counterweight attached to the magnetic bar adjacent one end thereof, the improvement comprising,
compensation means for reducing the effect of magnetic dip of said magnetic bar in said magnetic compass, and for reducing the effect of acceleration forces on said magnetic bar in said magnetic compass, said compensation means comprises a mass mounted on said magnetic bar adjacent the other end of said magnetic bar and having the same density as the fluid wherein said mass is, effectively, a weightless mass.

2. The compass recited in claim 1 wherein,
said compensation means is integrally formed with said magnetic bar.

3. The compass recited in claim 1 wherein,
said compensation means has the same mass as a conventional counterweight attached to the opposite end of the magnetic bar.

4. The compass recited in claim 1 wherein,
said compensation means comprises a hollow body attached to said magnetic bar.

5. The compass recited in claim 1 wherein,
said fluid comprises a liquid.

6. The compass recited in claim 1 including,
pivot means mounted within said housing for rotatably supporting said magnetic bar.

7. The compass recited in claim 1 wherein, said magnetic bar comprises a unitary needle component.

8. The compass recited in claim 1 wherein,
said magnetic bar comprises a single needle component.

* * * * *